(12) United States Patent
Fujiyasu et al.

(10) Patent No.: US 7,465,495 B2
(45) Date of Patent: Dec. 16, 2008

(54) COMPOSITE BLACK OXIDE PARTICLE, METHOD FOR PRODUCING SAME, BLACK COATING MATERIAL AND BLACK MATRIX

(75) Inventors: Shoichi Fujiyasu, Okayama (JP); Tomio Hayashi, Okayama (JP); Koichi Katsuyama, Okayama (JP); Hiroyuki Shimamura, Tokyo (JP)

(73) Assignee: Mitsu Mining & Smelting Co., Ltd., Tokyo (JP)

( * ) Notice: Subject to any disclaimer, the term of this patent is extended or adjusted under 35 U.S.C. 154(b) by 259 days.

(21) Appl. No.: 10/576,125

(22) PCT Filed: Oct. 14, 2004

(86) PCT No.: PCT/JP2004/015132

§ 371 (c)(1),
(2), (4) Date: May 10, 2006

(87) PCT Pub. No.: WO2005/037716

PCT Pub. Date: Apr. 28, 2005

(65) Prior Publication Data

US 2007/0128438 A1     Jun. 7, 2007

(30) Foreign Application Priority Data

Oct. 15, 2003  (JP) .............................. 2003-355596
Feb. 27, 2004  (JP) .............................. 2004-054586
Mar. 9, 2004   (JP) .............................. 2004-066201

(51) Int. Cl.
  *B32B 5/16* (2006.01)
(52) U.S. Cl. ..................... 428/402; 428/403; 428/404; 148/251; 148/272; 148/282; 148/425; 427/453
(58) Field of Classification Search ................ 428/402, 428/403, 404; 148/251, 272, 282, 425; 427/453
See application file for complete search history.

(56) References Cited

U.S. PATENT DOCUMENTS

| 4,512,818 | A | * | 4/1985 | Valayil et al. ................ 148/251 |
| 5,277,936 | A | * | 1/1994 | Olson et al. .................. 427/453 |
| 6,362,239 | B1 | * | 3/2002 | Buess et al. .................. 515/715 |
| 6,680,272 | B2 | * | 1/2004 | Buess et al. .................. 502/115 |

FOREIGN PATENT DOCUMENTS

| JP | 09-237570 | 9/1997 |
| JP | 10-231441 | 2/1998 |
| JP | 2000-162643 | 6/2000 |
| JP | 2002-20119 | 1/2002 |

* cited by examiner

*Primary Examiner*—Leszek Kiliman
(74) *Attorney, Agent, or Firm*—Young & Thompson

(57) ABSTRACT

Disclosed is a composite black oxide particle which is composed of oxide of cobalt, copper and manganese. The copper/cobalt molar ratio is 0.1-0.5, and the manganese/cobalt molar ratio is 0.2-1.0. The composite black oxide particle further contains silicon, and the silicon content to the total oxide particle is 0.1-3 mass %. The surface of the composite black oxide particle is coated with aluminum oxide. The Al content in the surface coating to the entire particle is 0.05-3 mass %.

20 Claims, No Drawings

US 7,465,495 B2

COMPOSITE BLACK OXIDE PARTICLE, METHOD FOR PRODUCING SAME, BLACK COATING MATERIAL AND BLACK MATRIX

TECHNICAL FIELD

The present invention relates to a complex black oxide particle, a process for producing the same, a black coating material, and a black matrix. More particularly, it relates to a complex black oxide particle which contains the oxides of cobalt, copper, and manganese and is suitable as a black pigment for coating material, ink, toner, rubber, plastic, and the like. In particular, it relates to a complex black oxide particle which is excellent in blackness and is suitable as a black color composition for a black matrix, or a black electrode or a light-shielding layer for front panels of plasma displays or plasma address liquid crystal displays, a process for producing the same, a black coating material and a black matrix.

BACKGROUND ART

A black pigment used for coating material, ink, toner, rubber, plastic, and the like is required to have excellent performances in blackness, hue, tinting strength, or hiding power as well as low cost. Carbon black, iron oxide-based pigments including magnetite, or the other complex oxide pigments have been used for each purpose.

Nowadays, in any application areas described above, improvement in performance and quality is not the only requirement for the black pigment. For example, a black pigment consisting of a metal oxide as a main component is required to have not only an excellent blackness but also excellent performances in oxidation resistance required in sintering process in the production of black matrixes, dispersibility in vehicles required in the preparation of a coating material using resin or solvent, or surface smoothness of a coating film prepared from the coating material. As a typical example of a black pigment consisting of a metal oxide as a main component is listed a particle of single metal oxide (consisting of only one kind of metal) such as cobalt oxide, manganese oxide or copper oxide, or a particle of complex oxide (consisting of two or more kinds of metals) such as Cu—Cr, Cu—Mn, Cu—Cr—Mn, Cu—Fe—Mn, Co—Mn—Fe, or Co—Fe—Cr oxide.

Regarding the single metal oxide, a particle which has a larger particle size has a higher blackness, but a particle which has a particle size in submicron order has a brown tint and such a particle is not easy to produce.

Regarding the complex oxide, it also has advantages and disadvantages from the standpoint of the performances required for a black pigment. First, a complex oxide such as Cu—Cr or Cu—Cr—Mn oxide which contains chromium has, in addition to the problem of chromium toxicity, such a disadvantage that a particle in submicron order is not easy to produce.

Further, as disclosed in Patent Document 1, microparticulation of a complex oxide particle of Cu—Mn is easy, but the particle easily deforms into an indefinite form and easily coagulates into an aggregate, resulting in poor dispersibility in the preparation of a coating material containing the particles and poor surface smoothness of a coating film.

As disclosed also in Patent Document 1, a complex oxide particle of Cu—Fe—Mn has a high blackness, and is excellent in dispersibility because it has good uniformity in shape. Also a complex oxide particle of Co—Mn—Fe disclosed in Patent Document 2 has good uniformity in shape and is excellent in dispersibility. However, since both particles described above contain iron, and their blackness depends on $Fe^{2+}$, they are easily degraded with time. It is said that both particles are poor in weather resistance and oxidation resistance.

As mentioned above, there has not been known to date a satisfactory black pigment containing a metal oxide as a main ingredient, which is excellent in blackness, oxidation resistance, dispersibility in the preparation of a coating material containing the particles, and surface smoothness of a coating film prepared from the coating material.

Besides the above-mentioned prior art, it is required for a high light-shielding film of black matrix on-array type used for plasma displays or plasma address liquid crystal displays to have high electric resistance to ensure prevention of electrical leakage between electrodes. As a consequence, it is needless to say that a black pigment which is used to prepare the film preferably has high electrical resistance as described in Patent Document 3. The electrical resistance of the conventional metal oxides is not in a high level that is required for a black pigment. A material having still higher electrical resistance has been demanded.

Patent Document 1: JP-A-1997-237570
Patent Document 2: JP-A-1998-231441
Patent Document 3: JP-A-2000-162643

DISCLOSURE OF THE INVENTION

Therefore, it is an object of the present invention to provide a complex black oxide particle suitable as a black pigment for mainly coating material, ink, toner, rubber, or plastic, and a process for producing the same. Particularly, it is an object of the present invention to provide a complex black oxide particle suitable for a color composition for black matrixes, or a black electrode or a light-shielding layer for a front panel of plasma displays or plasma address liquid crystal displays, and a process for producing the same. It is still further an object of the present invention to provide a complex black oxide particle which is excellent in blackness, oxidation resistance, dispersibility in the preparation of a coating material containing the particles, and surface smoothness of a coating film prepared from the coating material, and a process for producing the same.

As a result of intensive studies on a material that contains various kinds of metal oxides as a main ingredient, the present inventors have found that the above object is accomplished with a specific complex oxide particle of Co—Cu—Mn, and completed the present invention.

A complex oxide particle of the present invention consists of oxides of cobalt, copper, and manganese. The molar ratio of copper/cobalt is 0.1 to 0.5 and the molar ratio of manganese/cobalt is 0.2 to 1.0.

BEST MODE FOR CARRYING OUT THE INVENTION

Preferred embodiments for carrying out the present invention will hereinafter be described. The first embodiment of a complex black oxide particle according to the present invention consists of oxides of cobalt, copper, and manganese, in which the molar ratio of copper/cobalt is 0.1 to 0.5 and the molar ratio of manganese/cobalt is 0.2 to 1.0.

In the examination of complex black oxide particles in the invention, the present inventors have prepared various types (composition) of complex black oxide particles and have found that many of these have a shape of plate or indefinite form. For example, a complex black oxide particle of Co—Mn, Co—Cu, or Co—Mn—Fe tended to provide a particle of plate form. A complex black oxide particle of Mn—Cu, Mn—Cu—Ni, or Co—Fe—Cr tended to provide a particle of indefinite form. Among the particles having a shape of plate form, some of them had good uniformity in shape to a certain extent. However, the dispersibility in the preparation of a coating material containing the particles was by far poor as compared with that of a complex black oxide particle of Co—Cu—Mn having a shape of spherical or quasi-spherical form. Further, a particle having a shape of indefinite form was found to show not only poor dispersibility in the preparation of a coating material containing the particles but also show poor surface smoothness of a coating film prepared from the coating material.

In view of the above-described finding, the present inventors have firstly examined a complex black oxide particle having a shape of granular, particularly spherical or quasi-spherical, and found that excellent dispersibility in the preparation of a coating material containing the particles and surface smoothness were achieved by a complex black oxide particle of Cu—Fe—Mn or Co—Cu—Mn. A complex black oxide particle of Cu—Fe—Mn is excellent in blackness as well as in dispersibility in the preparation of a coating material containing the particles and surface smoothness of a coating film prepared from the coating material. However, the complex black oxide particle of Cu—Fe—Mn is poor in oxidation resistance, resulting in color change or degradation by oxidation.

From the above-mentioned examination, it was found that a complex black oxide particle of Co—Cu—Mn was preferable. However, the Co—Cu—Mn oxide does not achieve all of the objects of the present invention. So the present inventors have focused attention on the amounts or ratios of the constituents of the oxide.

Firstly in the first embodiment of the invention, the molar ratio of copper/cobalt is 0.1 to 0.5, particularly it is essential to be 0.15 to 0.45. When the molar ratio is smaller than 0.1, the resultant particle tends to become coarse and large and becomes poor in tinting strength of a coating material containing the particles. At a molar ratio larger than 0.5, a particle having a shape of indefinite form tends to develop and the dispersibility and blackness in the preparation of a coating material containing the particles become poor.

Further in the first embodiment of the invention, the molar ratio of manganese/cobalt is 0.2 to 1.0, particularly it is essential to be 0.3 to 0.9. When the molar ratio is less than 0.2, the resultant particle tends to get a shape of indefinite form such as a plate form and becomes poor in dispersibility in the preparation of a coating material containing the particles and also becomes poor in tinting strength of a coating film prepared from the coating material. When the molar ratio is larger than 1.0, the obtained particle tends to get a shape of indefinite form such as plate form. In addition, the particle tends to collapse into fine powder, and the red color of the particle becomes strong.

A complex black oxide particle according to the first embodiment of the invention has a crystal structure of a spinel or inversed-spinel type in many cases. Such a crystal structure is excellent in blackness or hue as compared with the other crystal structures, and is preferable. Whether the particle has a crystal structure of a spinel or inversed-spinel type or the other crystal structures can be judged from the measurement of XRD. Whether the particle has a crystal structure of a spinel type or an inversed-spinel type can be judged from the Moessbauer spectroscopy. In the present invention, it is significant that the complex black oxide particle has a crystal structure of a spinel or inversed-spinel type, and it is not so significant whether the crystal structure is a spinel type or an inversed-spinel type.

A complex black oxide particle according to the first embodiment of the invention preferably has an average particle diameter of 0.05 to 0.15 µm. A complex black oxide particle having such a fine particle size provides an excellent surface smoothness of a coating film of a coating material containing the particles, and the coating film gets a high degree of gloss.

A complex black oxide particle according to the embodiment of the invention preferably has an oil absorption amount of 40 ml/100 g or less. When the oil absorption amount exceeds 40 ml/100 g, aggregation of particles frequently occurs, resulting in the poor dispersibility in the preparation of a coating material containing the particles.

A complex black oxide particle according to the first embodiment of the invention the invention preferably has a BET specific surface area of 10 to 40 $m^2/g$. When the BET specific surface area is smaller than 10 $m^2/g$, the particle itself becomes too large in size and this sometimes leads to a failure of poor tinting strength of a coating material containing the particles. When the BET specific surface area is more than 40 $m^2/g$, the surface smoothness of a coating film of a coating material containing the particles is poor. Further such a too fine particle sometimes causes lowering in blackness.

A complex black oxide particle according to the first embodiment of the invention preferably has a coefficient of variation (CV value) of equal to or smaller than 40%, which is given by the equation: CV value (%)=(standard deviation of Feret (µm) obtained from SEM image)/(mean value of Feret (µm) obtained from SEM image)×100. When the CV value is more than 40%, the particle size distribution becomes too broad and there are too many aggregated particles and too many larger particles. This leads to poor dispersibility in the preparation of a coating material containing the particles and poor surface smoothness of a coating film prepared from the coating material.

A complex black oxide particle according to the first embodiment of the invention preferably has an "L" value of equal to or smaller than 20 as measured with a color difference meter, an "a" value of equal to or smaller than 0.1, and a "b" value of equal to or smaller than 0.1 in the blackness and hue measurement of powder in accordance with JIS K5101-1991. When these values do not satisfy the above conditions, the particle has a reduced blackness and a hue stronger in red or yellow, and is not suitable as a black pigment.

A complex black oxide particle according to the first embodiment of the invention preferably has a "ΔE" value of equal to or smaller than 0.5 which is given by blackness and hue values using the equation of $(\Delta L^2+\Delta a^2+\Delta b^2)^{1/2}$ for a test specimen before and after heat treatment at 180° C. for 2 hours in air. When this "ΔE" value exceeds 0.5, the particle becomes poor in oxidation resistance.

A complex black oxide particle according to the first embodiment of the invention preferably has an "L" value of equal to or smaller than 35 as measured with a color difference meter, an "a" value of equal to or smaller than −0.5, and a "b" value of equal to or smaller than −3.5 in the tinting strength measurement using titanium oxide. When these values do not satisfy the above conditions, the particle has a reduced blackness and a hue stronger in red or yellow, and is not appropriate as a black pigment.

Hereinafter, a process for producing a complex black oxide particle according to the first embodiment of the invention will then be described. The process for producing a complex black oxide particle according to the first embodiment of the invention is characterized in the processes: an aqueous solution of mixed metal salt prepared from water-soluble salts of cobalt, copper, and manganese is mixed and neutralized with alkali hydroxide to obtain a slurry of metal hydroxide; the resultant slurry of metal hydroxide is kept at a pH of 10 to 13 and oxidized at a temperature of higher than 40° C. and equal to or lower than 60° C. to obtain a precursor slurry; the temperature of the resultant precursor slurry is elevated to a range of 80 to 150° C. so as to age the precursor slurry; after solid-liquid separation of the resultant precursor slurry, a solid content is subjected to heat treatment at 400 to 700° C. for longer than 1 hour and equal to or shorter than 3 hours.

In the present process, the ratio of cobalt, copper, and manganese is significant when a mixed solution is prepared from water-soluble salts of cobalt, copper, and manganese. Specifically, it is significant that the molar ratio of copper/cobalt is 0.1 to 0.5, particularly 0.15 to 0.45. Further it is significant that the molar ratio of manganese/cobalt is 0.2 to 1.0, particularly 0.3 to 0.9. In order to dissolve the metal salts into an aqueous solution, the temperature of the aqueous solution is preferably regulated at 30 to 60° C. Below 30° C., undissolved metal salts are likely to remain in the aqueous solution, so that when the aqueous solution is mixed with alkali hydroxide to form a complex hydroxide, the complex hydroxide having a non-uniform composition may be formed. At a temperature of higher than 60° C., the size of nuclei tends to be non-uniform, and eventually the resultant complex oxide particles are inferred to have a non-uniform particle size.

The metal salts of cobalt, copper, and manganese used for the preparation of the mixed aqueous solution are not limited so long as they are water-soluble, which include sulfate, nitrate, carbonate, chloride, or any salt according to the property of the solution used in the reaction system. Taking into consideration the productivity, the metal ion concentration in the mixed aqueous solution may be controlled at 0.5 to 2.0 mol/L as the total ion concentration.

Thus prepared aqueous solution of the water soluble salts of cobalt, copper, and manganese is mixed and neutralized with alkali hydroxide to form a hydroxide slurry in which cobalt, copper, and manganese are mixed.

The alkali hydroxide used in neutralization is preferably caustic alkali such as sodium hydroxide or potassium hydroxide. Mixing and neutralization can be carried out in any manner, but it is preferred that alkali hydroxide be added to the aqueous solution of water-soluble salts of cobalt, copper, and manganese. A particle with a nuclei of hydroxide having a uniform composition can be obtained by adding alkali hydroxide within 60 to 120 minutes. An addition time shorter than 60 minutes tends to cause formation of hydroxide having non-uniform composition or formation of particles with a shape of indefinite form. When the addition time exceeds 120 minutes, hydroxide having a uniform composition can be obtained, but the nuclei keep on growing and particles with a shape of indefinite form are likely to develop.

The pH of the resultant hydroxide slurry is adjusted at 10 to 13 and an appropriate oxidizing agent, for example, hydrogen peroxide and the like, is added or oxygen-containing gas, preferably air, is bubbled into the slurry so as to form complex black oxide particles in the slurry. At a pH lower than 10, particles are not easy to grow up and fine particles are likely to easily develop. On the other hand, at a pH higher than 13, particles are likely to have a shape of indefinite form. The temperature of the above reaction is higher than 40° C. and equal to or lower than 60° C. At a temperature of equal to or lower than 40° C., the resultant particles are likely to become fine in particle size and blackness is likely to decrease. At a temperature of higher than 60° C., particles having a shape of indefinite are likely to easily develop in many cases.

Oxidation is continued until oxidation-reduction potential in the slurry reaches to equilibrium. The resultant slurry is heated to 80 to 150° C. After heating, the slurry is stirred at 80 to 100° C. for 1 to 6 hours or treated at 100 to 150° C. in an autoclave so as to age the complex black oxide particles in the slurry. This aging process is essential to allow the reaction to proceed and to form granular particles. At an aging temperature lower than 80° C. (lower than 100° C., in the case of the treatment using an autoclave), the reaction does not easily proceed, so that granular particles cannot develop and particles having a shape of indefinite form are likely to easily develop. At an aging temperature higher than 100° C. (higher than 150° C., in the case of the treatment using an autoclave), higher reaction rate is likely to cause a wider particle size distribution of the resultant particles. This is undesirable.

The slurry which contains the complex black oxide particles after the aging process is, after conventional processes of filtering, washing, and dehydration, dried at 50 to 120° C. and then pulverized. The pulverized complex black oxide particles are heated at 400 to 700° C. for longer than 1 hour or equal to or shorter than 3 hours so as to stabilize their shape. When the heating time is shorter than 1 hour, the shape of the oxide is not stabilized, so that the hue of the resultant particles is likely to become poor. When the heating time exceeds 3 hours, tinting strength is likely to decrease because of sintering effect of the particles. At a heating temperature lower than 400° C., the shape of the oxide is not stabilized, and this may lead to loosing stability in various characteristics of the particles. At a heating temperature higher than 700° C., blackness or hue may become poor because of excess load of heat. Either atmosphere of air or inert gas can be used for the heat treatment. After the heat treatment, the complex black oxide particles sometimes partly aggregate. In that case, conventional disassembling treatments can be applied to the particles.

A black pigment prepared from the complex black oxide particle contained in a coating material according to the first embodiment of the invention, and a black matrix, a plasma display or a plasma address liquid crystal display prepared from the black pigment are excellent in blackness, oxidation resistance, and uniformity and gloss of a sintered film.

Hereinafter, the second embodiment of the invention will be described. About anything not particularly cited regarding the second embodiment of the invention, any description regarding the first embodiment of the invention is also applied to the second embodiment of the invention. A complex black oxide particle according to the second embodiment of the invention is the one in which a complex black oxide particle according to the first embodiment of the invention further contains silicon. The content of silicon is 0.1 to 3% by mass based on the whole oxide particle. That is, a complex black oxide particle according to the second embodiment of the invention consists of the oxides of cobalt, copper, manganese, and silicon. The molar ratio of copper/cobalt is 0.1 to 0.5, the molar ratio of manganese/cobalt is 0.2 to 1.0, and the content of silicon is 0.1 to 3% by mass based on the whole oxide particle.

By involving silicon further in a complex black oxide particle of the invention which consists of the oxides of cobalt, copper, and manganese, the particle provides an effect of enhancing surface smoothness of a coating film of a coating material containing the particles. Another effect of preventing thermal degradation of hue is also provided.

Silicon can exist either in the inside or on the surface of the particle. It is essential that the content of silicon is 0.1 to 3.0% by mass based on the whole oxide particle, particularly 0.2 to 2.0% by mass. At a content of less than 0.1% by mass, the effect of enhancing surface smoothness of a coating film is decreased. At a content of over 3.0% by mass, the specific surface area of the particle becomes too large and surface smoothness of a coating film also becomes poor. Further, blackness and hue are damaged.

A complex black oxide particle according to the second embodiment of the invention preferably has a reflectance at 20 degrees of equal to or higher than 40% as measured with a color difference meter, more preferably equal to or higher than 60%. At a reflectance of lower than 40%, gloss of a coating film of a coating material containing the particles becomes poor.

A preferable process for producing a complex black oxide particle according to the second embodiment of the invention will then be described. A complex black oxide particle according to the second embodiment of the invention is prepared as follows: an aqueous solution of mixed metal salt prepared from water soluble salts of cobalt, copper, and manganese is mixed and neutralized with alkali hydroxide to obtain a slurry of metal hydroxide; the resultant slurry of metal hydroxide is kept at a pH of 10 to 13 and oxidized to obtain a precursor slurry; then the pH of the resultant precursor slurry is adjusted at 6 to 10 by adding an aqueous solution of water-soluble silicate; after solid-liquid separation of the resultant precursor slurry, a solid content is subjected to heat treatment at 400 to 700° C. to obtain the particle.

Up to the oxidation reaction step of the slurry of metal hydroxide, the production of the particle is allowed to proceed in the same manner as described in the process according to the first embodiment of the invention. Oxidation is continued until oxidation and reduction potential in the slurry reaches to equilibrium. Through the oxidation is obtained a precursor slurry containing oxides of cobalt, copper, and manganese. To the resultant slurry is added an aqueous solution of water-soluble silicate. Before the addition of the aqueous solution, the complex black oxide particles in the slurry can be aged by heating the precursor slurry to 80 to 150° C., and then stirring it at 80 to 100° C. for 1 to 6 hours, or by treating the slurry at 100 to 150° C. in an autoclave or the like.

This aging process is desirable, because it allows the reaction to proceed and to develop granular particles. At an aging temperature lower than 80° C. (lower than 100° C., in the case of the treatment using an autoclave), the reaction does not easily proceed, so that granular particles cannot develop and particles having a shape of indefinite form are likely to easily develop. At an aging temperature higher than 100° C. (higher than 150° C., in the case of the treatment using an autoclave), higher reaction rate is likely to cause a wider particle size distribution of the resultant particles. This is undesirable.

An aqueous solution of water-soluble silicate is added to the slurry and stirred while the pH of the slurry is controlled at 6 to 10. In this addition process, when the pH is lower than 6 or higher than 10, a layer is not easily developed on the surface of the particle. It is preferred that the aqueous solution of water-soluble silicate be added over 30 to 120 minutes, and the slurry be stirred also over 30 to 120 minutes after the addition. After that, the slurry is subjected to heat treatment in the same manner as in the process according to the first embodiment of the invention, and an object product of a complex black oxide particle is obtained.

Now then, in the above-described process of producing a complex black oxide particle, in place of adding an aqueous solution of silicate before the precursor slurry is separated into solid and liquid, an aqueous solution of silicate can be added to water-soluble salts of cobalt, copper, and manganese so as to obtain a complex black oxide particle according to the present invention. That is, a complex black oxide particle according to the second embodiment of the invention can be also produced by mixing and neutralizing an aqueous solution of mixed salts, which is prepared by using water-soluble salts of cobalt, copper, and manganese and an aqueous solution of water-soluble silicate with alkali hydroxide to obtain a slurry of metal hydroxide; oxidizing the resultant slurry of metal hydroxide while keeping the pH at 10 to 13 to obtain a precursor slurry; and then heating a solid content at 400 to 700° C. after solid-liquid separation of the resultant precursor slurry.

A black pigment in a coating material using the complex black oxide particle according to the second embodiment of the invention, and a black matrix, a plasma display or a plasma address liquid crystal display which is prepared from the black pigment are excellent in blackness and prevention of thermal degradation of hue. In addition to that, the black pigment in a coating material is excellent in surface smoothness of a coating film.

Hereinafter, the third embodiment of the invention will be described. About anything not particularly cited regarding the third embodiment of the invention, any description regarding the first embodiment of the invention and the second embodiment of the invention is also applied to the third embodiment of the invention. A complex black oxide particle according to the third embodiment of the invention is the one where Al oxide is coated on the surface of a complex black oxide particle according to the first embodiment of the invention. That is, a complex black oxide particle according to the third embodiment of the invention consists of the oxides of cobalt, copper, and manganese. The molar ratio of copper/cobalt is 0.1 to 0.5, the molar ratio of manganese/cobalt is 0.2 to 1.0, and Al oxide is coated on the surface of the particle.

In the third embodiment of the invention, the surface of a complex black oxide particle is coated with Al oxide, so that the complex black oxide attains a high electrical resistance. The Al content is preferably 0.05 to 3% by mass based on the whole particle, particularly 0.2 to 2.8% by mass. At an Al content of below 0.05% by mass, an intended effect of getting high electrical resistance becomes small. Al content of over 3% by mass of causes reduction in blackness and dispersibility.

By involving the compounds of P or Si in the Al oxide layer coated on the surface of the particle can be attained still higher electrical resistance while keeping dispersibility. This is desirable. The total content of Al and P is preferably 0.1 to 6% by mass based on the whole particle, particularly 0.4 to 4% by mass. The total content of Al and Si (silicon) is preferably 0.1 to 6% by mass based on the whole particle, particularly 0.4 to 4% by mass. When the above total content is below each lower limit, an effect of getting high electrical resistance becomes small, while over the upper limit leads to lowering in blackness as well as lowering in dispersibility and surface smoothness.

As described above, a complex black oxide particle according to the third embodiment of the invention has a high electrical resistance. The complex black oxide particle preferably has an electrical resistance of equal to or higher than $1 \times 10^4$ Ωcm. At an electrical resistance of below $1 \times 10^4$ Ωcm, it is difficult to ensure prevention of electrical leakage between electrodes in the application of black matrixes.

A preferable process for producing a complex black oxide particle according to the third embodiment of the invention will then be described. A complex black oxide particle according to the third embodiment of the invention is prepared as follows: an aqueous solution of mixed metal salt prepared from water-soluble salts of cobalt, copper, and manganese is mixed and neutralized with alkali hydroxide to obtain a slurry of metal hydroxide; the resultant slurry of metal hydroxide is kept at a pH of 10 to 13 and oxidized at a temperature of higher than 40° C. and equal to or lower than 60° C. to obtain a precursor slurry; the resultant precursor slurry is heated to 80 to 150° C. and aged; an aqueous solution of water-soluble aluminum salt is added to the slurry, and the slurry is kept at a pH of 5 to 9; after solid-liquid separation of the slurry, the resulting solid content is subjected to heat treatment at 400 to 700° C. for longer than 1 hour and equal to or shorter than 3 hours to obtain the particle.

Up to the oxidation reaction step of the slurry of metal hydroxide, the production of the particle is allowed to proceed in the same manner as described in the process according to the first embodiment of the invention. Oxidation is continued until oxidation and reduction potential in the slurry reaches to equilibrium. The resultant slurry is heated to 80 to 150° C., and then the complex black oxide particles in the slurry are aged by stirring the slurry at 80 to 100° C. for 1 to 6 hours or treating the slurry at 100 to 150° C. in an autoclave or the like. This aging process is essential to allow the reaction to proceed and to develop granular particles. At an aging temperature lower than 80° C. (lower than 100° C., in the case of the treatment using an autoclave), the reaction does not easily proceed, so that granular particles cannot develop and particles having a shape of indefinite form are likely to easily develop. At an aging temperature higher than 100° C. (higher than 150° C., in the case of the treatment using an autoclave), higher reaction rate is likely to cause a wider particle size distribution of the resultant particles. This is undesirable.

An aqueous solution of water-soluble aluminum salt is added to the slurry of complex black oxide particles after the aging process while the pH of the slurry is controlled at 5 to 9. The amount of water-soluble aluminum salt added is adjusted at 0.05 to 3% by mass as Al content based on the whole particle. The aqueous solution of water-soluble aluminum salt can be added in any manner, but it is preferred that the solution be added gradually over 30 to 120 minutes so as to develop a layer uniformly on the surface of the particle.

On the pH adjustment, if the pH is lower than 5 or higher than 9, a layer would not easily develop on the surface of the particles. As the water-soluble aluminum salt used is listed aluminum sulfate, aluminum chloride, aluminum nitrate, sodium aluminate and the like.

After water-soluble aluminum salt is added, an aqueous solution of water-soluble phosphorus compounds or an aqueous solution of water-soluble silicon compounds can be successively added while the pH of the slurry is controlled at 6 to 10. Through this process, an Al oxide layer which contains P or Si compounds can be coated on the surface of the particle. The amount of the phosphorus or silicon compounds added can be adjusted in a manner that the total content of Al and P or Al and Si in the layer on the surface of the resultant complex black oxide particle comes into the range described above. It is preferred that the aqueous solution of water-soluble phosphorous compounds or the aqueous solution of water-soluble silicon compounds be added gradually over 30 to 120 minutes in the same manner as in the case of the aqueous solution of water-soluble aluminum salt. After that, heat treatment is carried out in the same manner as in the process according to the first embodiment of the invention, and an object product of a complex black oxide particle is obtained.

For the same reason as in the case where only water-soluble aluminum salt is added, it is preferred that the pH be adjusted at 5 to 9 after the addition of water-soluble aluminum salt and before the addition of the aqueous solution of water-soluble phosphorous compounds or the aqueous solution of water-soluble silicon compounds.

In addition, when the aqueous solution of water-soluble phosphorus compounds or the aqueous solution of water-soluble silicon compounds is added, the pH after the addition is adjusted at 6 to 10 for the same reason as in the case of the addition of water-soluble aluminum salt. As the water-soluble phosphorus compounds used herein are listed phosphate such as sodium phosphate, potassium phosphate or ammonium monophosphate, orthophosphoric acid, or phosphorous acid. As the water-soluble silicon compounds are listed sodium silicate and others.

When the addition is carried out after water-soluble aluminum salt is preliminary mixed with the aqueous solution of water-soluble phosphorous compounds or the aqueous solution of water-soluble silicon compounds, the mixed hydroxide of aluminum and phosphorus or aluminum and silicon is separated by precipitation, so that the layer is not easy to develop on the surface of the particle. Further, when the water-soluble aluminum salt, the aqueous solution of water-soluble phosphorous compounds, or the aqueous solution of water-soluble silicon compounds are added at the same time, the layer tends to develop nonuniformly on the surface of the particle.

A black pigment in a coating material containing the complex black oxide particle according to the third embodiment of the invention, and a black matrix, a plasma display or a plasma address liquid crystal display which is prepared from the black pigment are excellent in blackness, oxidation resistance, and gloss of a sintered film, and have a high electrical resistance.

The present invention will now be illustrated in greater detail with reference to

EXAMPLES

Example 1-1

Cobalt sulfate hepta-hydrate ($CoSO_4.7H_2O$): 830 grams, copper sulfate penta-hydrate ($CuSO_4.5H_2O$): 224 grams, and manganese sulfate penta-hydrate ($MnSO_4.5H_2O$): 324 grams were put in 6 liters of 45° C. water and dissolved by stirring. Then, 7.1 liters of 1 mol/L caustic soda were added to the resultant mixed aqueous solution over about 90 minutes, and the pH of the resultant slurry of hydroxide was adjusted at 12. After the addition, the temperature of the slurry (reaction solution) was 50° C. After 30 minutes passed from the end of the pH adjustment, air was bubbled into the slurry at a flow rate of 3 liters/minute for about 2 hours while the temperature of the reaction solution was kept at 50° C. While keeping stirring, the reaction solution was heated to 85° C. over 60 minutes, and then kept for 1 hour. After the one-hour keeping up, the resultant slurry of complex iron oxide particles was filtered off and washed, and the washed cake was dried at 80° C. for 10 hours. The dried product was pulverized and sintered in air at 600° C. for 2 hours to obtain complex iron oxide particles having a particle size of 0.07 μm and a BET specific Methods of Evaluation:

(a) Co, Cu, and Mn content: a sample was dissolved and measured with ICP.

(b) Average particle diameter: an image was observed with SEM (scanning electron microscope) at a magnification of 100,000 times, and Feret was measured for 200 particles.

(c) Specific surface area: measured with 2200 BET meter supplied by Shimadzu-Micromeritics Corp.

(d) Oil absorption: measured in accordance with JIS K 5101.

(e) Blackness, Hue: blackness of particles was measured in accordance with JIS K5101-1991. To 2.0 grams of a sample were added 1.4 cc of castor oil, and they were kneaded with a Hoover automatic muller; to 2.0 grams of the kneaded sample were added 7.5 grams of lacquer; after the sample was further kneaded, it was coated on a mirror-coated paper with a 4 mil applicator; after the coating was dried, blackness ("L" value) and hue ("a" value, "b" value) were measured with a color difference meter (trade name: color analyzer-TC-1800, supplied by TOKYO DENSHOKU CO., LTD.).

(f) Tinting strength (dispersibility of coating material): to 0.5 gram of a sample and 1.5 grams of titanium oxide (trade name: R800, supplied by ISHIHARA SANGYO KAISHA, LTD.) were added 1.3 cc of castor oil, and they were kneaded with a Hoover automatic muller; to 2.0 grams of the kneaded sample were added 4.5 grams of lacquer; after the sample was further kneaded, it was coated on a mirror-coated paper with a 4 mil applicator; after the coating was dried, tinting strength was measured with a color difference meter (trade name: color analyzer-TC-1800, supplied by TOKYO DENSHOKU CO., LTD.).

(g) Oxidation resistance test: a sample was put on a watch glass and dried at 180° C. using a ventilation type dryer (Type PH-201, supplied by TABAI ESPEC CO.) for 2 hours, and then blackness, hue, and tinting strength were measured in the same manner as in (e) and (f).

(h) Specular reflectance (gloss associated with surface smoothness of a coating film): 60 grams of a solution dissolving styrene-acrylic resin (TB-1000F) at a ratio of resin:toluene=1:2, 10 grams of a sample after heat treatment, and 90 grams of glass beads with a diameter of 1 mm were put in a bottle having an inside volume of 140 ml, after the bottle was stoppered, they were mixed with a coating material shaker (supplied by TOYO SEIKI KOGYO CO., LTD.) for 30 minutes. The resultant coating material was coated on a glass plate with a 4 mil applicator and dried. The reflectance at 60 degrees was measured with a MURAKAMI GLOSS METER GM-3M.

Examples 1-2 and 1-3, Comparative Examples 1-1 to 1-5

Complex oxide particles were obtained in the same manner as in EXAMPLE 1-1, except that each condition for production is changed as shown in TABLE 1-1. The resultant complex oxide particle was evaluated for various properties and characteristics in the same manner as in EXAMPLE 1-1. The results obtained are shown in TABLE 1-2.

TABLE 1

TABLE 1-1

| | Aqueous solution of mixed metal salts | | | | | | | |
|---|---|---|---|---|---|---|---|---|
| | $CoSO_4 \cdot 7H_2O$ charged amounts (grams) | $CuSO_4 \cdot 5H_2O$ charged amounts (grams) | $MnSO_4 \cdot 5H_2O$ charged amounts (grams) | $Cr_3(SO_4)_2 \cdot 7H_2O$ charged amounts (grams) | Solution temperatures (°C.) | Addition time (minutes) | Air oxidation temperatures (°C.) | Sintering time (hours) |
| Example 1-1 | 830 | 224 | 324 | 0 | 45 | 90 | 50 | 2 |
| Example 1-2 | 492 | 179 | 256 | 0 | 45 | 90 | 50 | 2 |
| Example 1-3 | 1124 | 156 | 211 | 0 | 45 | 90 | 50 | 2 |
| Comparative Example 1-1 | 225 | 245 | 350 | 0 | 45 | 90 | 50 | 2 |
| Comparative Example 1-2 | 830 | 0 | 0 | 0 | 45 | 90 | 50 | 2 |
| Comparative Example 1-3 | 0 | 245 | 350 | 784 | 25 | 60 | 30 | 1 |
| Comparative Example 1-4 | 742 | 202 | 0 | 0 | 50 | 60 | 50 | 2 |
| Comparative Example 1-5 | 759 | 0 | 260 | 0 | 50 | 60 | 50 | 2 |

TABLE 2

TABLE 1-2

| | Content of each element | | | | | | Average particle diameter μm | CV value | BET $m^2/g$ | shape | Oil absorption ml/100 g | Initial Blackness and hue | | |
|---|---|---|---|---|---|---|---|---|---|---|---|---|---|---|
| | Co mass % mol | Cu mass % mol | Mn mass % mol | Cr mass % mol | Cu/Co molar ratio | Mn/Co molar ratio | | | | | | L | a | b |
| Example 1-1 | 36.7 0.62 | 12.0 0.19 | 22.4 0.41 | 0.0 0.00 | 0.30 | 0.65 | 0.07 | 20 | 24.0 | granular | 24 | 19.6 | −0.1 | −0.2 |
| Example 1-2 | 31.5 0.53 | 13.4 0.21 | 25.0 0.46 | 0.0 0.00 | 0.39 | 0.85 | 0.06 | 20 | 27.1 | granular | 26 | 19.8 | 0.0 | 0.1 |
| Example 1-3 | 48.6 0.82 | 8.2 0.13 | 14.2 0.26 | 0.0 0.00 | 0.16 | 0.31 | 0.08 | 20 | 21.0 | granular | 29 | 19.0 | −0.2 | −0.3 |
| Comparative Example 1-1 | 13.2 0.22 | 19.3 0.30 | 36.6 0.67 | 0.0 0.00 | 1.36 | 2.97 | 0.12 | 50 | 36.1 | indefinite | 52 | 20.3 | 0.2 | 0.3 |
| Comparative Example 1-2 | 66.7 1.17 | 0.0 0.00 | 0.0 0.00 | 0.0 0.00 | 0.00 | 0.00 | 0.12 | 50 | 38.0 | plate | 50 | 22.8 | 0.5 | 0.7 |
| Comparative Example 1-3 | 0.0 0.00 | 15.4 0.24 | 27.5 0.50 | 20.6 0.32 | — | — | 0.45 | 50 | 61.1 | granular | 38 | 25.8 | 0.1 | 0.5 |
| Comparative Example 1-4 | 51.8 0.88 | 17.1 0.27 | 0.0 0.00 | 0.0 0.00 | 0.31 | 0.00 | 0.35 | 60 | 8.4 | plate | 15 | 21.5 | 0.1 | 0.8 |
| Comparative Example 1-5 | 53.0 0.90 | 0.0 0.00 | 20.0 0.36 | 0.0 0.00 | 0.00 | 0.40 | 0.12 | 50 | 39.1 | plate | 70 | 22.5 | 0.1 | 0.4 |

TABLE 2-continued

TABLE 1-2

|  | Initial Tinting strength | | | After oxidation resistance test | | | | | | | reflectance at 60° |
|---|---|---|---|---|---|---|---|---|---|---|---|
|  | | | | Blackness and hue | | | | Tinting strength | | | |
|  | L | a | b | L | a | b | ΔE | L | a | b | |
| Example 1-1 | 29.8 | −0.7 | −3.5 | 19.6 | 0.0 | −0.2 | 0.10 | 29.8 | −0.8 | −3.4 | 85 |
| Example 1-2 | 30.6 | −0.6 | −3.6 | 19.8 | 0.0 | 0.0 | 0.10 | 30.6 | −0.5 | −3.7 | 80 |
| Example 1-3 | 28.4 | −0.8 | −3.7 | 19.1 | −0.2 | −0.2 | 0.14 | 28.5 | −0.8 | −3.6 | 85 |
| Comparative Example 1-1 | 33.0 | −1.0 | −4.4 | 20.2 | 0.3 | 0.2 | 0.17 | 32.9 | −0.9 | −4.3 | 65 |
| Comparative Example 1-2 | 38.7 | 0.5 | 0.8 | 23.2 | 0.6 | 0.8 | 0.42 | 39.2 | 0.6 | 0.9 | 50 |
| Comparative Example 1-3 | 63.6 | −1.3 | −2.6 | 25.9 | 0.2 | 0.6 | 0.17 | 63.7 | −1.1 | −2.5 | 40 |
| Comparative Example 1-4 | 57.4 | 0.1 | 0.8 | 21.6 | 0.2 | 0.9 | 0.17 | 58.1 | 0.2 | 0.9 | 50 |
| Comparative Example 1-5 | 37.3 | 0.2 | 0.6 | 23.0 | 0.2 | 0.4 | 0.51 | 37.8 | 0.3 | 0.8 | 50 |

As is apparent from TABLE 1-2, the complex black oxide particles of Examples were excellent in blackness, hue, oxidation resistance, dispersibility in the preparation of a coating material containing the particles, surface smoothness of a coating film of the coating material. From the results of XRD measurement, although which are not shown in the table, it was confirmed that the complex black oxide particles of Examples had a crystal structure of at least spinel or inversed-spinel type.

In contrast, the complex oxide particles of Comparative example 1-1 had a shape of indefinite form because of too large molar ratios of copper/cobalt and manganese/cobalt. These particles were excellent in tinting strength, but were poor in blackness, hue, and surface smoothness of a coating film of a coating material containing the particles.

The complex oxide particles of Comparative example 1-2 were poor in tinting strength as well as blackness and hue because copper and manganese were not added to the particles. These particles had a shape of plate form, so that were poor in surface smoothness of a coating film of a coating material containing the particles.

The complex oxide particles of Comparative example 1-3 which consisted of chromium, copper, and manganese were poor in blackness, tinting strength, and surface smoothness of a coating film of a coating material containing the particles.

The complex oxide particles of Comparative example 1-4 which consisted of cobalt and copper were poor in blackness, hue, tinting strength, and surface smoothness of a coating film prepared from a coating material containing the particles.

The complex oxide particles of Comparative example 1-5 which consisted of cobalt and manganese were poor in blackness, hue, tinting strength, and surface smoothness of a coating film of a coating material containing the particles.

Example 2-1

Cobalt sulfate hepta-hydrate ($CoSO_4 \cdot 7H_2O$): 830 grams, copper sulfate penta-hydrate ($CuSO_4 \cdot 5H_2O$): 224 grams, and manganese sulfate penta-hydrate ($MnSO_4 \cdot 5H_2O$): 324 grams were put in 6 liters of 45° C. water and dissolved by stirring. Then, 7.1 liters of 1 mol/L caustic soda were added to the resultant aqueous solution over about 90 minutes, and the pH of the resultant slurry of hydroxide was adjusted at 12. After the addition, the temperature of the reaction solution was 50° C. After 30 minutes passed from the end of the pH adjustment, air was bubbled into the reaction solution at a flow rate of 3 liters/minute for about 2 hours while the temperature of the reaction solution was kept at 50° C. While keeping stirring, the reaction solution was heated to 85° C. over 60 minutes, and then kept for 1 hour. After the one-hour keeping up, to the resultant slurry of complex iron oxide particles were added 1.6 liters of 0.1 mol/L aqueous solution of sodium silicate over 60 minutes, followed by adjusting the pH of the slurry at 7 with dilute sulfuric acid and further mixing and stirring over 60 minutes. After that, the slurry was filtered off and washed, and the washed cake was dried at 80° C. for 10 hours. The dried product was pulverized and sintered in air at 600° C. for 2 hours to obtain complex iron oxide particles having a particle size of 0.07 μm and a BET specific surface area of 27 $m^2/g$. The resultant complex oxide particles were evaluated for properties and characteristics by the methods described below. The results are shown in TABLE 2-2 and TABLE 2-3.

Methods of Evaluation:

Evaluation was carried out in the same manner as in Example 1-1, except that the specular reflectance was measured at 20 degrees.

Example 2-2

Cobalt sulfate hepta-hydrate ($CoSO_4 \cdot 7H_2O$): 830 grams, copper sulfate penta-hydrate ($CuSO_4 \cdot 5H_2O$): 224 grams, and manganese sulfate penta-hydrate ($MnSO_4 \cdot 5H_2O$): 324 grams were put in 6 liters of 45° C. water and dissolved by stirring, followed by adding 1.6 liters of 0.1 mol/L sodium silicate. Then, 7.1 liters of 1 mol/L caustic soda were added to the resultant aqueous solution over about 90 minutes, and the pH of the resultant slurry of hydroxide was adjusted at 12. After the addition, the temperature of the reaction solution was 50° C. After 30 minutes passed from the end of the pH adjustment, air was bubbled into the slurry at a flow rate of 3 liters/minute for about 2 hours while the temperature of the reaction solution was kept at 50° C. While keeping stirring, the reaction solution was heated to 85° C. over 60 minutes, and then kept for 1 hour. After the one-hour keeping up, the resultant slurry of complex iron oxide particles was filtered off and washed, and the washed cake was dried at 80° C. for 10 hours. The dried product was pulverized and sintered in air at 600° C. for 2 hours to obtain complex iron oxide particles having a particle size of 0.07 μm and a BET specific surface area of 26 $m^2/g$. The resultant complex oxide particles were evaluated for properties and characteristics in the same manner as in Example 1. The results are shown in TABLE 2-2 and TABLE 2-3.

TABLE 3

TABLE 2-1

| | Aqueous solution of mixed metal salts | | | | Addition of sodium silicate | | |
|---|---|---|---|---|---|---|---|
| | $CoSO_4 \cdot 7H_2O$ charged amounts (grams) | $CuSO_4 \cdot 5H_2O$ charged amounts (grams) | $MnSO_4 \cdot 5H_2O$ charged amounts (grams) | 0.1 mol/L sodium silicate added amounts (L) | Addition timing | Addition time (minutes) | Conditions for treatments after addition |
| Example 2-1 | 830 | 224 | 324 | 1.6 | after oxidation | 60 | adjusted at pH 7, then subjected to solid-liquid separation |
| Example 2-2 | 830 | 224 | 324 | 1.6 | at the time when the other metal salt aqueous solutions are added | one-time addition | neutralized with caustic soda, then oxidized while keeping at pH 12 |

TABLE 4

TABLE 2-2

| | Content of each element | | | | | | | | | | | Cu/Co molar ratio | Mn/Co molar ratio |
|---|---|---|---|---|---|---|---|---|---|---|---|---|---|
| | Co Mass % | Cu mass % | Mn mass % | Si mass % | Co mol | Cu mol | Mn mol | Total mol mol | Co mol % | Cu mol % | Mn mol % | | |
| Example 2-1 | 36.0 | 11.9 | 22.2 | 0.90 | 0.61 | 0.19 | 0.40 | 1.20 | 0.51 | 0.16 | 0.34 | 0.31 | 0.66 |
| Example 2-2 | 36.1 | 11.8 | 22.1 | 0.95 | 0.61 | 0.19 | 0.40 | 1.20 | 0.51 | 0.15 | 0.34 | 0.30 | 0.66 |

TABLE 5

TABLE 2-3

| | Average Particle diameter | | BET | Initial Blackness and hue | | | After oxidation resistance test Blackness and hue | | | | reflectance at |
|---|---|---|---|---|---|---|---|---|---|---|---|
| | μm | CV Value | $m^2/g$ | L | a | b | L | a | b | ΔE | 20° |
| Example 2-1 | 0.07 | 21 | 27 | 19.7 | −0.1 | −0.2 | 19.7 | −0.1 | −0.2 | 0.05 | 65 |
| Example 2-2 | 0.07 | 22 | 26 | 19.8 | −0.1 | −0.3 | 19.8 | −0.1 | −0.4 | 0.05 | 70 |

As is apparent from TABLE 2-3, the complex black oxide particles of Examples were excellent in blackness and hue before and after oxidation resistance test, particularly in surface smoothness of a coating film of a coating material containing the particles. From the results of XRD measurement, although which are not shown in the table, it was confirmed that the complex black oxide particles of Examples had a crystal structure of at least spinel or inversed-spinel type.

Example 3-1

Cobalt sulfate hepta-hydrate ($CoSO_4 \cdot 7H_2O$): 830 grams, copper sulfate penta-hydrate ($CuSO_4 \cdot 5H_2O$): 224 grams, and manganese sulfate penta-hydrate ($MnSO_4 \cdot 5H_2O$): 324 grams were put in 6 liters of 45° C. water and dissolved by stirring.

Then, 7.1 liters of 1 mol/L caustic soda were added to the resultant mixed aqueous solution over about 90 minutes, and the pH of the resultant slurry of hydroxide was adjusted at 12. After completion of the addition, the temperature of the reaction solution was 50° C. After 30 minutes passed from the end of the pH adjustment, air was bubbled into the slurry at a flow rate of 3 liters/minute for about 2 hours while the temperature of the reaction solution was kept at 50° C. While keeping stirring, the reaction solution was heated to 85° C. over about 60 minutes, and then kept for 1 hour. After the one-hour keeping up, to the reaction solution were added 4.5 liters of 0.1 mol/L aqueous solution of sodium aluminate over 60 minutes, followed by adjusting the pH of the slurry at 6 and further mixing and stirring over 60 minutes. The resultant slurry was filtered off and washed, and the washed cake was dried at 80° C. for 10 hours. The dried product was pulverized and sintered in air at 600° C. for 2 hours to obtain complex iron oxide particles having a particle size of 0.07 μm and a BET specific surface area of 24 $m^2/g$. The resultant complex oxide particles were evaluated for properties and characteristics by the methods described below. The results are shown in TABLE 3-2 and TABLE 3-3.

Methods of Evaluation:

Evaluation was carried out in the same manner as in Example 1-1, except that the specular reflectance was measured at 20 degrees. In addition, electrical resistance was measured in accordance with the following method.

Electrical resistance: a sample weighing 10 grams was put into a holder and molded under a pressure of 600 kg/$cm^2$ into a tablet of 25 mm in diameter. Electrodes were attached to the tablet, and the resistance was measured under a load of 150 kg/$cm^2$. The electrical resistance of the complex oxide particles was calculated from the thickness, cross-sectional area of the sample used in the measurement and the measured electrical resistance value. The conditions for the measurement were 25° C. and 55% RH.

Examples 3-2 and 3-3

Complex oxide particles were obtained in the same manner as in Example 3-1, except that each condition for production was changed as shown in TABLE 3-1. The resultant complex oxide particles were evaluated for properties and characteristics in the same manner as in Example 3-1. The results are shown in TABLE 3-2 and TABLE 3-3.

TABLE 6

TABLE 3-1

| | Aqueous solution of mixed metal salts | | | Surface treatment | | | | | | | | |
|---|---|---|---|---|---|---|---|---|---|---|---|---|
| | $CoSO_4 \cdot 7H_2O$ | $CuSO_4 \cdot 5H_2O$ | $MnSO_4 \cdot 5H_2O$ | 0.1 mol/L sodium aluminate | | | 0.1 mol/L sodium silicate | | | 0.1 mol/L phosphoric acid | | |
| | charged amounts (grams) | charged amounts (grams) | charged amounts (grams) | Added amounts (L) | Addition time (minutes) | pH adjustment | Added amounts (L) | Addition time (minutes) | pH adjustment | Added amounts (L) | Addition time (minutes) | pH adjustment |
| Example 3-1 | 830 | 224 | 324 | 4.5 | 60 | 6 | — | — | — | — | — | — |
| Example 3-2 | 830 | 224 | 324 | 3.2 | 60 | 9 | — | — | — | 2.5 | 60 | 7 |
| Example 3-3 | 830 | 224 | 324 | 2.4 | 60 | 7 | 1.6 | 60 | 7 | — | — | — |

TABLE 7

TABLE 3-2

Content of each element

| | Co mass % | Cu mass % | Mn mass % | Al mass % | Si mass % | P mass % | Co mol | Cu mol | Mn mol | Total mol | Co mol % | Cu mol % | Mn mol % | Cu/Co molar ratio | Mn/Co molar ratio |
|---|---|---|---|---|---|---|---|---|---|---|---|---|---|---|---|
| Example 3-1 | 34.0 | 11.8 | 21.9 | 2.8 | 0.0 | 0.0 | 0.58 | 0.19 | 0.40 | 1.16 | 0.50 | 0.16 | 0.34 | 0.32 | 0.69 |
| Example 3-2 | 32.0 | 11.5 | 21.5 | 2.0 | 0.0 | 1.8 | 0.54 | 0.18 | 0.39 | 1.12 | 0.49 | 0.16 | 0.35 | 0.33 | 0.72 |
| Example 3-3 | 32.7 | 11.8 | 22.2 | 1.5 | 0.9 | 0.0 | 0.55 | 0.19 | 0.40 | 1.14 | 0.48 | 0.16 | 0.35 | 0.33 | 0.73 |

TABLE 8

TABLE 3-3

| | Average particle diameter μm | BET $m^2/g$ | Electrical resistance Ω cm | Initial Blackness and hue | | | After oxidation resistance test Blackness and hue | | | ΔE | reflectance at 20° |
|---|---|---|---|---|---|---|---|---|---|---|---|
| | | | | L | a | b | L | a | b | | |
| Example 3-1 | 0.06 | 22 | $3.0 \times 10^5$ | 19.7 | 0.1 | 0.1 | 19.7 | 0.1 | 0.1 | 0.05 | 60 |
| Example 3-2 | 0.07 | 21 | $5.0 \times 10^6$ | 19.8 | 0.0 | 0.1 | 19.8 | 0.0 | 0.2 | 0.05 | 65 |
| Example 3-3 | 0.07 | 28 | $1.0 \times 10^5$ | 19.9 | -0.1 | -0.2 | 19.9 | -0.1 | -0.2 | 0.05 | 70 |

As is apparent from TABLE 3-3, the complex black oxide particles of Examples were excellent in blackness and hue before and after oxidation resistance test, dispersibility in the preparation of a coating material containing the particles, surface smoothness of a coating film of a coating material containing the particles, having sufficiently high electrical resistance. From the results of XRD measurement, although which are not shown in the table, it was confirmed that the complex black oxide particles of Examples had a crystal structure of at least spinel or inversed-spinel type.

INDUSTRIAL APPLICABILITY

A complex black oxide particle according to the present invention is still more excellent in blackness, oxidation resistance, dispersibility in the preparation of a coating material containing the particles, and surface smoothness of a coating film prepared from the coating material, so that the particle is suitable as a black pigment for coating material, ink, toner, rubber, or plastic. Particularly the particle is suitable for a color composite for black matrixes, or a black electrode or a light-shielding layer for a front panel of plasma displays or plasma address liquid crystal displays. Black matrixes, plasma displays, or plasma address liquid crystal displays which are prepared from a black coating material in which the complex black oxide particle is used are excellent in blackness, oxidation resistance, and uniformity and gloss of a sintered coating film.

In particular, a complex black oxide particle according to the present invention, which contains silicon, is excellent not only in blackness, hue, and heat resistance, but also particularly in surface smoothness of a coating film of a coating material containing the particles. Black matrixes, plasma displays, or plasma address liquid crystal displays which are prepared from such a black coating material of the complex black oxide particle are excellent in blackness, hue, heat resistance, and uniformity and gloss of a sintered coating film.

Further, a complex black oxide particle according to the present invention, whose surface is coated with Al oxide, is excellent in blackness, oxidation resistance, dispersibility in the preparation of a coating material containing the particles, and surface smoothness of a coating film of the coating material. Particularly, the particle has a high electrical resistance, so that the particle is suitably used for a color composition for black matrixes, or a black electrode or a light-shielding layer for a front panel of plasma displays or plasma address liquid crystal displays. Black matrixes, plasma displays, or plasma address liquid crystal displays which are prepared from a black coating material in which the complex black oxide particle is used not only show excellent performance in blackness, oxidation resistance, and gloss of a sintered coating film, but also have a high electrical resistance.

The invention claimed is:

1. A complex black oxide particle characterized in that the particle comprises oxides of cobalt, copper, and manganese, and the molar ratio of copper to cobalt is 0.1 to 0.5, and the molar ratio of manganese to cobalt is 0.2 to 1.0.

2. The complex black oxide particle according to claim 1, wherein the particle is a spinel type or an inversed-spinel type.

3. The complex black oxide particle according to claim 1, wherein the primary particle diameter of the particle is 0.05 to 0.15 μm, and the coefficient of variation, CV value, which is given by the following equation (1) for a particle size distribution obtained by SEM observation, CV value (%)=(standard deviation of particle diameter (μm) obtained from SEM image)/(number-averaged particle diameter (μm) obtained from SEM image)×100 (1), is equal to or smaller than 40%.

4. The complex black oxide particle according to claim 1, wherein the particle has a BET specific surface area of 10 to 40 m$^2$/g.

5. The complex black oxide particle according to claim 1, wherein the particle has an oil absorption amount of equal to or lower than 40 ml/100 g.

6. The complex black oxide particle according to claim 1, wherein the particle further contains silicon, and the silicon content is 0.1 to 3% by mass based on the whole oxide particle.

7. The complex black oxide particle according to claim 6, wherein the particle has a reflectance at 20 degrees of equal to or higher than 40% as measured with a color difference meter.

8. The complex black oxide particle according to claim 1, wherein the particle has a layer of Al oxide on the surface of the particle.

9. The complex black oxide particle according to claim 8, wherein the Al content in the layer on the surface of the particle is 0.05 to 3% by mass based on the whole particle.

10. The complex black oxide particle according to claim 8, wherein the layer on the surface of the particle contains a P or Si compound.

11. The complex black oxide particle according to claim 10, wherein the total content of Al and P in the layer on the surface of the particle is 0.1 to 6% by mass based on the whole particle.

12. The complex black oxide particle according to claim 10, wherein the total content of Al and Si in the layer on the surface of the particle is 0.1 to 6% by mass based on the whole particle.

13. The complex black oxide particle according to claim 8, wherein the particle has an electrical resistance of equal to or higher than $1 \times 10^4$ Ωcm.

14. A black coating material comprising the complex black oxide particle according to claim 1.

15. A black matrix prepared from the black coating material according to claim 14.

16. A process for producing the complex black oxide particle recited in claim 1, wherein an aqueous solution of mixed metal salt prepared from water-soluble salts of cobalt, copper, and manganese is mixed and neutralized with alkali hydroxide to obtain a slurry of metal hydroxide;

the resultant slurry of metal hydroxide is kept at a pH of 10 to 13 and oxidized at a temperature of higher than 40° C. and equal to or lower than 60° C. to obtain a precursor slurry;

the resultant precursor slurry is aged at 80 to 150° C.; and after solid-liquid separation of the slurry, a solid content is subjected to heat treatment at 400 to 700° C. for longer than 1 hour and equal to or shorter than 3 hours.

17. A process for producing the complex black oxide particle recited in claim 6, wherein an aqueous solution of mixed metal salt prepared from water-soluble salts of cobalt, copper, and manganese is mixed and neutralized with alkali hydroxide to obtain a slurry of metal hydroxide;

the resultant slurry of metal hydroxide is oxidized while the pH of the slurry is kept at 10 to 13 to obtain a precursor slurry;

an aqueous solution of water-soluble silicate is added to the resultant precursor slurry, and the slurry is kept at a pH of 6 to 10; and after solid-liquid separation of the slurry, a solid content is subjected to heat treatment at 400 to 700° C.

18. A process for producing the complex black oxide particle recited in claim 6, wherein an aqueous solution of mixed metal salt prepared from water-soluble salts of cobalt, copper, and manganese and an aqueous solution of water-soluble silicate is mixed and neutralized with alkali hydroxide to obtain a slurry of metal hydroxide;

the resultant slurry of metal hydroxide is oxidized while the pH of the slurry is kept at 10 to 13 to obtain a precursor slurry; and after solid-liquid separation of the resultant precursor slurry, a solid content is subjected to heat treatment at 400 to 700° C.

19. A process for producing the complex black oxide particle recited in claim 8, wherein an aqueous solution of mixed metal salt prepared from water-soluble salts of cobalt, copper, and manganese is mixed and neutralized with alkali hydroxide to obtain a slurry of metal hydroxide;

the resultant slurry of metal hydroxide is kept at a pH of 10 to 13 and oxidized at a temperature of higher than 40° C. and equal to or lower than 60° C. to obtain a precursor slurry;

the resultant precursor slurry is aged at 80 to 150° C.;

an aqueous solution of water-soluble aluminum salt is added to the slurry, and the slurry is kept at a pH of 5 to 9; and after solid-liquid separation of the slurry, a solid content is subjected to heat treatment at 400 to 700° C. for longer than 1 hour and equal to or shorter than 3 hours.

20. A process for producing the complex black oxide particle recited in claim 10, wherein an aqueous solution of mixed metal salt prepared from water-soluble salts of cobalt, copper, and manganese is mixed and neutralized with alkali hydroxide to obtain a slurry of metal hydroxide;

the resultant slurry of metal hydroxide is kept at a pH of 10 to 13 and oxidized at a temperature of higher than 40° C. and equal to or lower than 60° C. to obtain a precursor slurry;

the resultant precursor slurry is aged at 80 to 150° C.;

an aqueous solution of water-soluble aluminum salt is added to the slurry, followed by adding an aqueous solution of water-soluble phosphorous compound or an aqueous solution of water-soluble silicon compound, and the slurry is kept at a pH of 6 to 10; and after solid-liquid separation of the slurry, a solid content is subjected to heat treatment at 400 to 700° C. for longer than 1 hour and equal to or shorter than 3 hours.

* * * * *